United States Patent
Egawa

(10) Patent No.: US 8,228,407 B2
(45) Date of Patent: Jul. 24, 2012

(54) SOLID-STATE IMAGE PICKUP DEVICE

(75) Inventor: Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 853 days.

(21) Appl. No.: 12/019,173

(22) Filed: Jan. 24, 2008

(65) Prior Publication Data

US 2008/0180556 A1    Jul. 31, 2008

(30) Foreign Application Priority Data

Jan. 26, 2007    (JP) .................. 2007-016893

(51) Int. Cl.
*H04N 9/083*    (2006.01)
*H04N 3/14*    (2006.01)
*H04N 5/335*    (2011.01)
*H04N 9/04*    (2006.01)

(52) U.S. Cl. .................. 348/272; 348/273; 382/167
(58) Field of Classification Search .................. None
See application file for complete search history.

(56) References Cited

U.S. PATENT DOCUMENTS

| 6,091,862 | A | 7/2000 | Okisu |
| 6,856,708 | B1 * | 2/2005 | Aoki .................. 382/284 |
| 6,940,556 | B1 * | 9/2005 | Tamune .................. 348/350 |
| 7,196,724 | B2 * | 3/2007 | Suzuki et al. .................. 348/223.1 |
| 2003/0016205 | A1 | 1/2003 | Kawabata et al. |
| 2005/0134713 | A1 | 6/2005 | Keshet et al. |
| 2005/0200733 | A1 | 9/2005 | Malvar |
| 2006/0114526 | A1 | 6/2006 | Hasegawa |
| 2008/0143844 | A1 * | 6/2008 | Innocent .................. 348/223.1 |

FOREIGN PATENT DOCUMENTS

| JP | 4-235472 | 8/1992 |
| JP | 5-168029 | 7/1993 |
| JP | 11-220751 | 8/1999 |
| JP | 2001-245307 | 9/2001 |
| JP | 2002-10108 | 1/2002 |
| JP | 2003-244715 | 8/2003 |
| JP | 2005-303731 | 10/2005 |

OTHER PUBLICATIONS

Honda et al., "A Novel Bayer-like COlor Filter Array for CMOS Image Sensors", SPIE, vol. 6492, 2007.*

(Continued)

*Primary Examiner* — Anthony J Daniels
(74) *Attorney, Agent, or Firm* — Oblon, Spivak, McClelland, Maier & Neustadt, L.L.P.

(57) ABSTRACT

A pixel section outputs R, G and B signals which are obtained by photoelectrically converting light incident on R, G and B pixels. An adding section determines a prescribed area in which a certain pixel is set as a central pixel, and adds the R, G and B signals from the central pixel and peripheral pixels arranged on the periphery of the central pixel in the prescribed area in order to produce an addition signal. A ratio calculating section calculates an average value of each of the R, G and B signals, and a ratio coefficient of the average value of each of the R, G and B signals to a total value of the average values. An RGB generating section generates a new R signal, G signal and B signal by using the addition signal and the ratio coefficients calculated by the ratio calculating section.

14 Claims, 15 Drawing Sheets

OTHER PUBLICATIONS

U.S. Appl. No. 12/123,816, filed May 20, 2008, Egawa.
U.S. Appl. No. 12/134,680, filed Jun. 6, 2008, Egawa.
U.S. Appl. No. 11/690,364, filed Mar. 23, 2007, Yoshinori Iida, et al.
U.S. Appl. No. 11/815,903, filed Aug. 9, 2007, Hiroto Honda, et al.

Office Action issued May 17, 2011 in Japan Application No. 2007-016893 (With English Translation).
Office Action issued Jul. 28, 2011, in Taiwanese Patent Application No. 097102636.

* cited by examiner

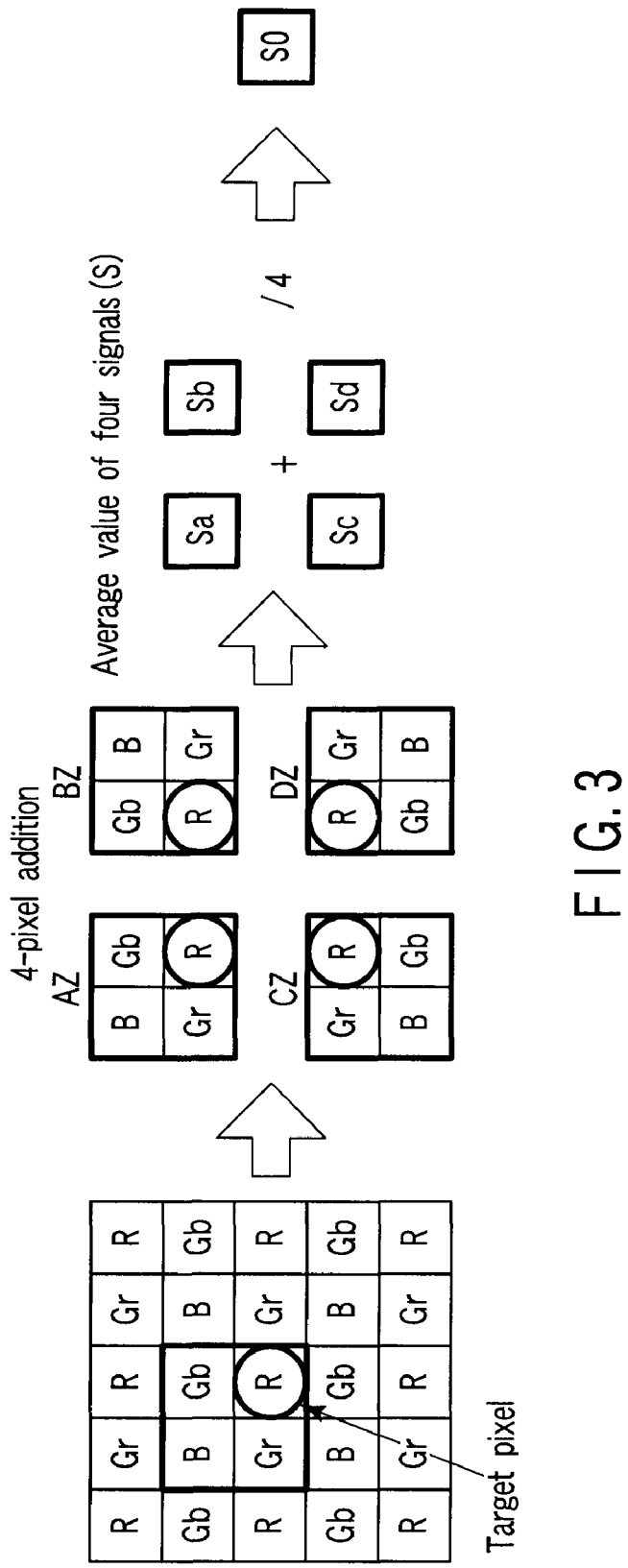
F I G. 3

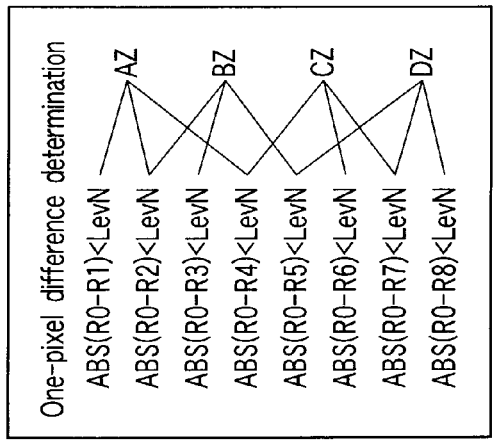

FIG. 6A

| D1 | D2 | D3 |
|----|----|----|
| D4 | D5 | D6 |
| D7 | D8 | D9 |

FIG. 6B

Two-pixel difference determination
 ABS((D6+D9)-(D1+D4))<LevN
 ABS((D8+D9)-(D1+D2))<LevN
 ABS((D4+D7)-(D3+D6))<LevN
 ABS((D7+D8)-(D2+D3))<LevN

FIG. 6C

Three-pixel stripe difference determination
 ABS((D3+D6+D9)-(D1+D4+D7))<LevN
 ABS((D7+D8+D9)-(D1+D2+D3))<LevN

FIG. 6D

Three-pixel L-shaped difference determination
 ABS((D6+D8+D9)-(D1+D2+D4))<LevN
 ABS((D4+D7+D8)-(D2+D3+D6))<LevN

FIG. 6E

Four-pixel difference determination
 ABS((D5+D6+D8+D9)-(D1+D2+D4+D5))<LevN
 ABS((D4+D5+D7+D8)-(D2+D3+D5+D6))<LevN

SOLID-STATE IMAGE PICKUP DEVICE

CROSS-REFERENCE TO RELATED APPLICATIONS

This application is based upon and claims the benefit of priority from prior Japanese Patent Application No. 2007-016893, filed Jan. 26, 2007, the entire contents of which are incorporated herein by reference.

BACKGROUND OF THE INVENTION

1. Field of the Invention

The present invention relates to a solid-state image pickup device such as a charge-coupled device (CCD) image sensor and a CMOS image sensor, and the solid-state image pickup device is used in, for example, a mobile-phone having an image sensor, a digital camera, and a video camera.

2. Description of the Related Art

As for the image sensor, in recent years, miniaturization of pixels has advanced, pixels of a size from 2.0 to 2.9 µm have already been put into practical use, and development of 1.7- and 1.4-µm pixels is now underway. In a minute pixel having a size of 2 µm or less, an amount of incident light largely decreases, and hence the signal-to-noise ratio is decreased. Further, heretofore, in a color camera, there has been a problem that an image quality is deteriorated due to a color artifact or color noise. Regarding suppression of a color artifact and noise reduction, various methods have been proposed (see, for example, Jpn. Pat. Appln. KOKAI Publication No. 4-235472, Jpn. Pat. Appln. KOKAI Publication No. 2002-10108, Jpn. Pat. Appln. KOKAI Publication No. 2005-303731, Jpn. Pat. Appln. KOKAI Publication No. 2001-245307, and Jpn. Pat. Appln. KOKAI Publication No. 5-168029). However, radical measures are not proposed.

BRIEF SUMMARY OF THE INVENTION

According to an aspect of the present invention, there is provided a solid-state image pickup device comprising: a pixel section in which an R pixel, G pixel and B pixel each having a photoelectric conversion element provided with a color filter of red (R), green (G) or blue (B) are arranged two-dimensionally in a matrix form, the pixel section outputting an R signal, G signal and B signal which are obtained by photoelectrically converting light incident on the R, G and B pixels; an adding section which determines a prescribed area in which a certain pixel is set as a central pixel, and which adds the R, G and B signals from the central pixel and peripheral pixels arranged on the periphery of the central pixel in the prescribed area to produce an addition signal; a ratio calculating section which calculates an average value of each of the R, G and B signals, and a ratio coefficient of the average value of each of the R, G and B signals to a total value of the average values; and an RGB generating section which generates a new R signal, G signal and B signal by using the addition signal and the ratio coefficients calculated by the ratio calculating section.

BRIEF DESCRIPTION OF THE SEVERAL VIEWS OF THE DRAWING

FIG. 3 is a view showing another addition processing method in an adding section of the color correlation RGB generating circuit of the first embodiment.

FIGS. 5A to 5F are views showing a processing method in an edge detecting circuit of a color correlation RGB generating circuit of the second embodiment.

FIGS. 6A to 6E are views showing another processing method in difference determination in a block of the second embodiment.

DETAILED DESCRIPTION OF THE INVENTION

A solid-state image pickup device of the embodiment of the present invention will be described below with reference to the accompanying drawings. Here, a CMOS image sensor is exemplified as a solid-state image pickup device. In the description, common parts are denoted by common reference symbols throughout all the drawings.

First Embodiment

First, a solid-state image pickup device including a CMOS image sensor of a first embodiment of the present invention will be described below.

Figure 1:
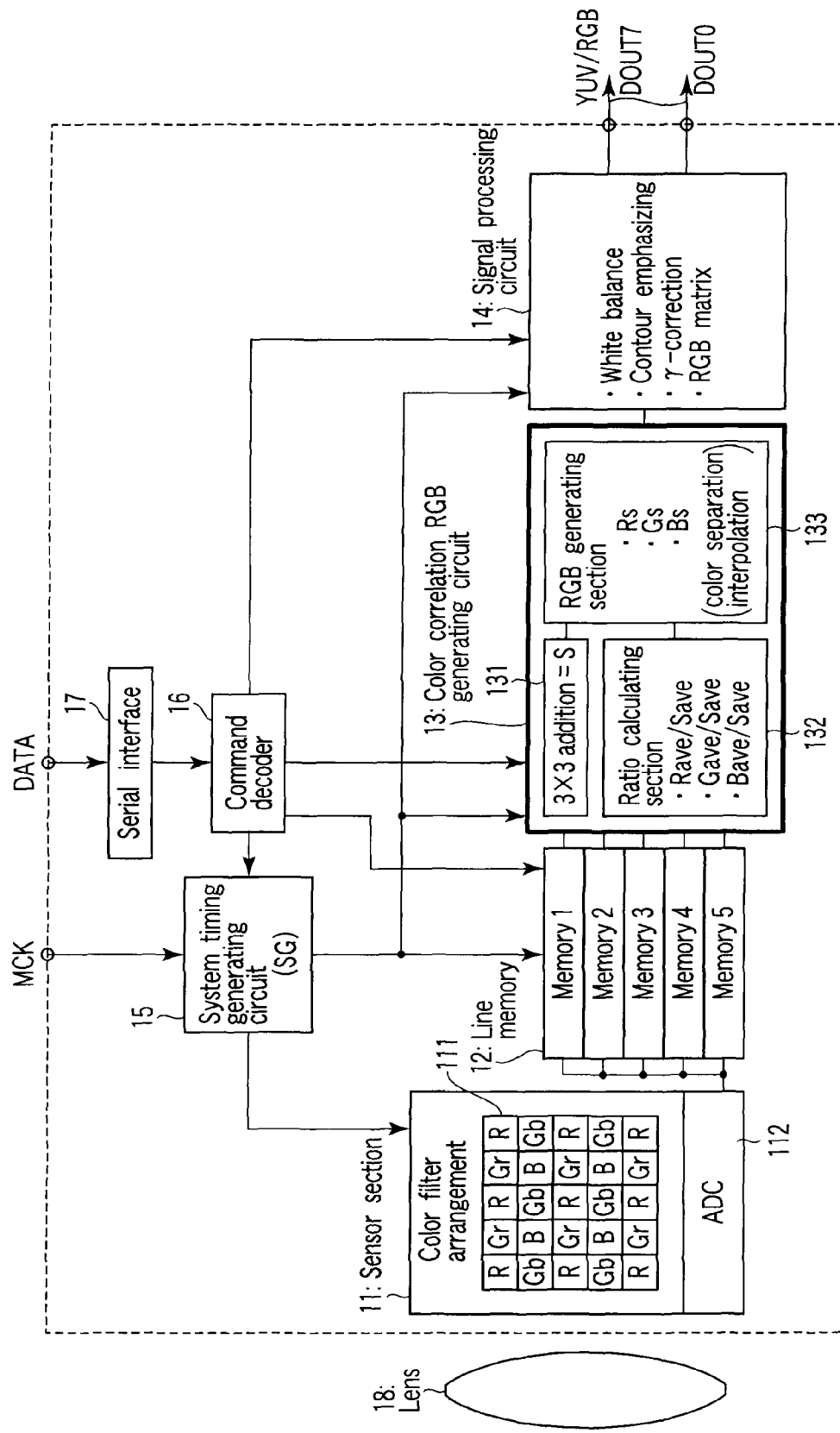
FIG. 1 is a block diagram showing a schematic configuration of a solid-state image pickup device of a first embodiment of the present invention.

FIG. 1 is a block diagram showing the schematic configuration of the solid-state image pickup device of the first embodiment. The solid-state image pickup device is provided with a sensor section 11, a line memory 12, a color correlation RGB generating circuit 13, a signal processing circuit 14, a system timing generating circuit (SG) 15, a command decoder 16, and a serial interface 17 as shown in FIG. 1.

A pixel section 111 and a column-type analog-to-digital converter (ADC) 112 are arranged in the sensor section 11. Pixels (cells) are arranged in a two-dimensional form of rows and columns in the pixel section 111 on a semiconductor substrate. Each pixel is constituted of a photoelectric converting means (for example, a photodiode) and a color filter, and color filters of three colors red (R), green (G), and blue (B) are arranged on the photodiodes. The color filter arrangement is the Bayer arrangement of the RGB three primary colors.

In the sensor section 11, a light signal condensed by a lens 18 is separated into RGB light signals by color filters of RGB three colors, and the RGB light signals are converted into signal charge by a photodiode array arranged in a two-dimensional form by photoelectric conversion. The signal charge is converted into digital signals (R, G and B signals) by the column-type analog-to-digital converter (ADC) 112. The converted digital signals are output to the line memory 12, and the digital signals for five vertical lines are stored in memories 1 to 5 in the line memory 12. The digital signals stored in the memories 1 to 5 are respectively input in parallel to the color correlation RGB generating circuit 13.

In the color correlation RGB generating circuit 13, the R, G and B signals input thereto from the line memory 12 are added up by an adding section 131 and an addition signal S is generated. Further, a ratio calculating section 132 calculates the respective ratio coefficients of the average values Rave, Gave and Bave of the R, G and B signals to the total value Save of the average values. Further, an RGB generating section 133 newly generates signals $R_s$, $G_s$ and $B_s$ from the addition signal S and the calculated ratio coefficients as signals of the same positions as the pixel arrangement. This processing serves as a replacement for the conventional color separation interpolation circuit.

Thereafter, the signals $R_s$, $G_s$ and $B_s$ processed by the RGB generating section 133 are input to the signal processing circuit 14 in the subsequent stage. The signals input to the signal processing circuit 14 are processed by a white balance circuit, contour emphasizing circuit, gamma correction circuit, RGB matrix circuit, and the like, in order to be turned into YUV signals and RGB signals and output as digital signals DOUT0 to DOUT7. Further, operations of the above-mentioned sensor section 11, line memory 12, color correlation RGB generating circuit 13, and signal processing circuit 14 are performed on the basis of a clock signal output from the system timing generating circuit (SG) 15. Further, a command can be controlled by data DATA input from the outside. The data DATA is input to the command decoder 16 through the serial interface 17, and a decoded signal is input to each circuit.

Next, a processing method of the color correlation RGB generating circuit 13 in the first embodiment will be described below.

Figure 2A:
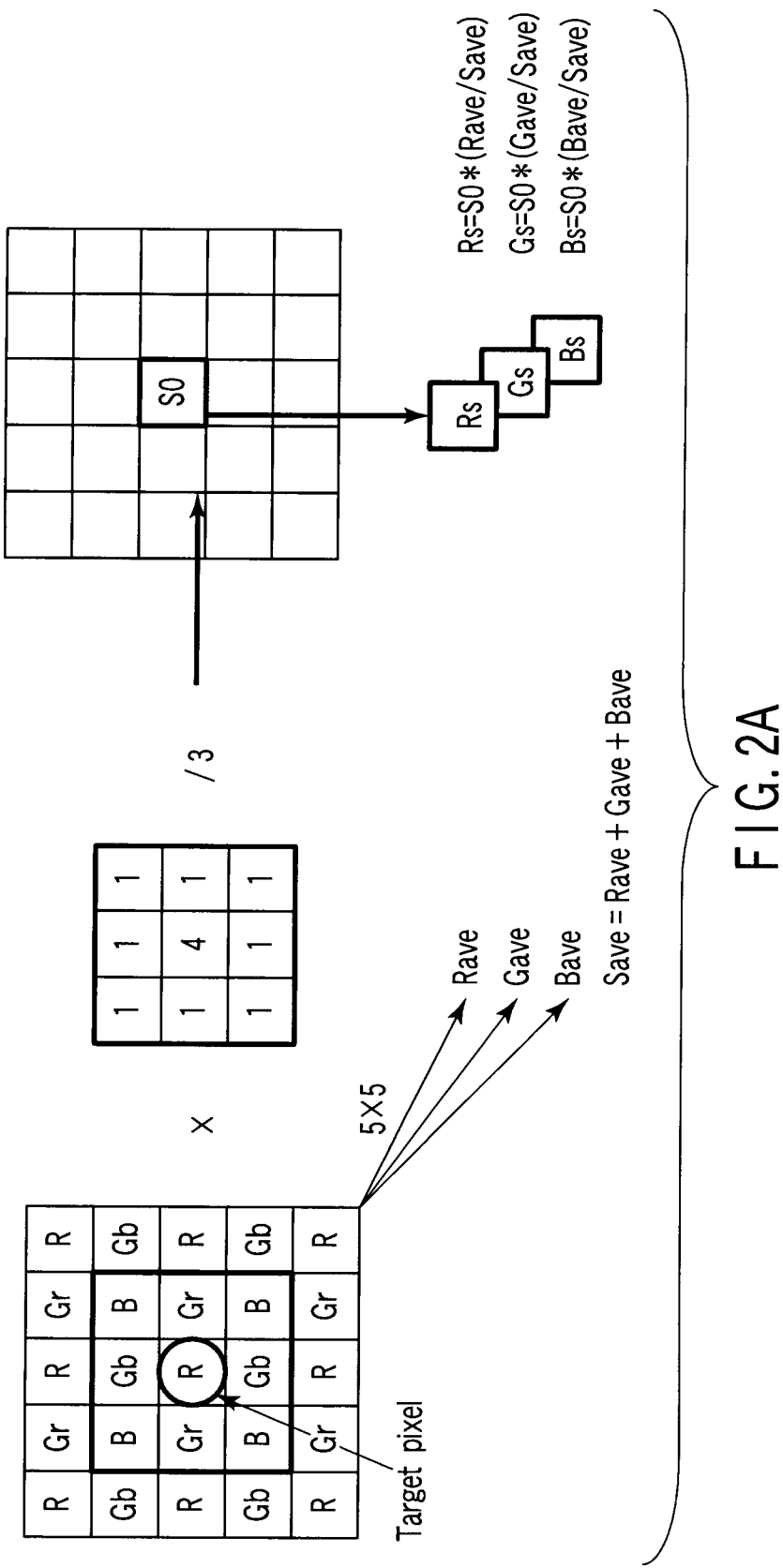
FIGS. 2A and 2B are a view showing a processing method in a color correlation RGB generating circuit of the first embodiment.

FIG. 2A is a view showing the processing method in the color correlation RGB generating circuit 13. A filter operation of 3×3 pixels is performed centering on the central pixel (target pixel) of the 5×5 pixel arrangement. The signal of the central pixel is multiplied by four by the adding section 131, signals of the pixels above and below and right and left are multiplied by one, signals of pixels at the corners are multiplied by one, and a signal level obtained by adding up these signals is multiplied by ⅓. A signal thus obtained is made an addition signal S0 of the 3×3 pixels.

Further, in the 5×5 pixel signals constituted of the RGB Bayer arrangement shown in FIG. 2A, average values of pixel signals of the same colors, i.e., the average values Rave (R average value), Gave (G average value) and Bave (B average value) of the R, G and B signals, and the total value Save of the average values are calculated, by the ratio calculating section 132. Further, new signals $R_s$, $G_s$ and $B_s$ are generated by the RGB generating section 133 by using the addition signal S0 and the ratio coefficients "$R_{ave}/S_{ave}$", "$G_{ave}/S_{ave}$" and "$B_{ave}/S_{ave}$" from the following formulas.

$$R_s = S0*(R_{ave}/S_{ave})$$

$$G_s = S0*(G_{ave}/S_{ave})$$

$$B_s = S0*(B_{ave}/S_{ave})$$

Here, by generating the addition signal S0, random noise is reduced from the addition signal S0. Further, by generating the signals $R_s$, $G_s$ and $B_s$ from the addition signal S0 as the pixel signals of the same position, the false color due to the conventional edge can be suppressed. Further, although color noise has been caused by single random noise of the R, G and B signals, by generating the $R_s$, $G_s$ and $B_s$ signals from the addition signal S0, random noise components of the $R_s$, $G_s$ and $B_s$ signals become the same, and hence color noise does not occur. That is, only brightness noise occurs (noise is not colored).

Another processing method employed in the color correlation RGB generating circuit 13 will now be described.

Figure 2B:
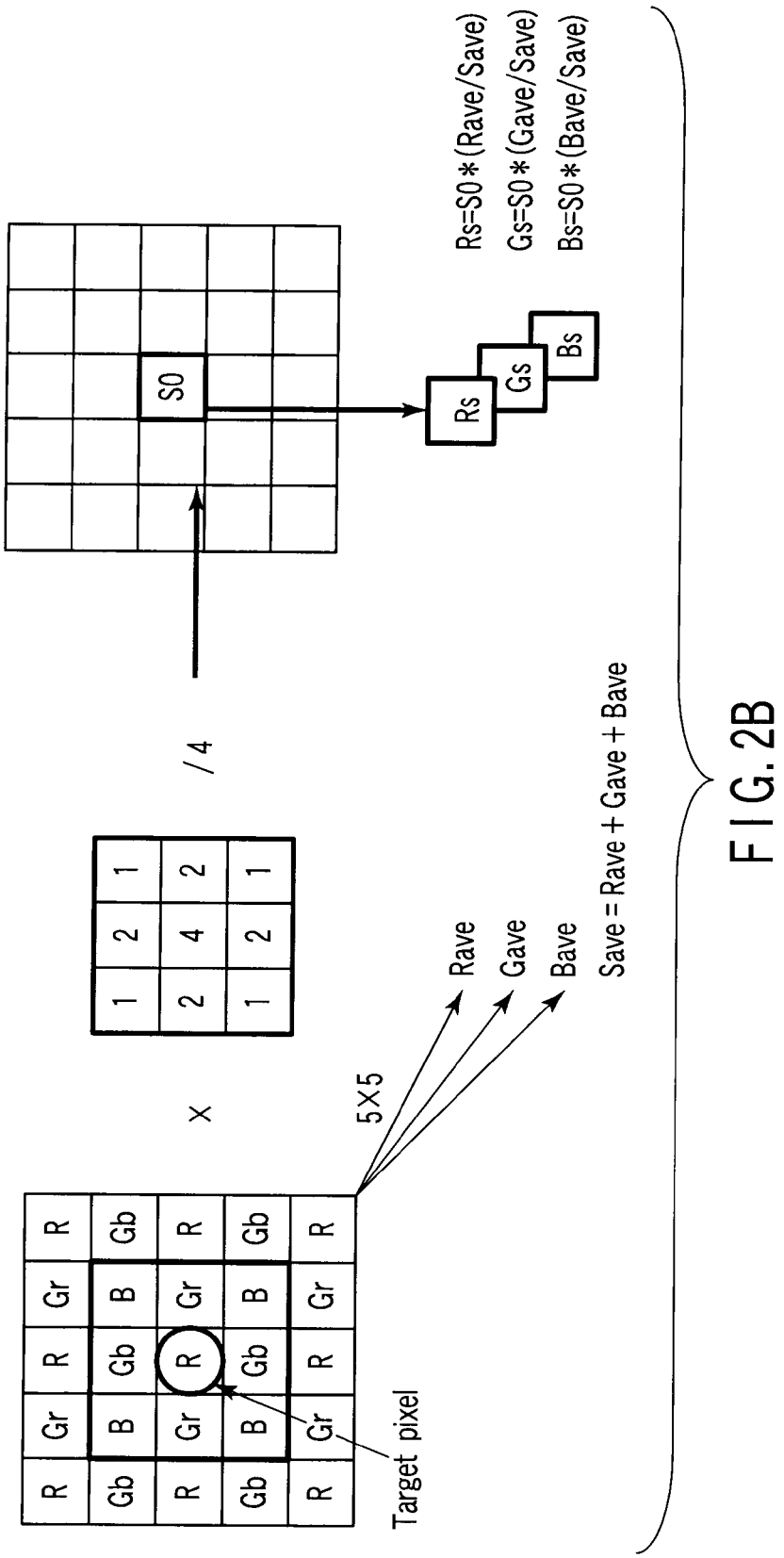

FIG. 2B shows another processing method employed in the color correlation RGB generating circuit 13. A filter operation is executed on each area of (3×3) pixels, which is formed of the central pixel (hereinafter referred to as the target pixel) of a (5×5) pixel area and the other 8 pixels around the target pixel. Specifically, in each area of (3×3) pixels, the adding section 131 multiplies the signal level of the target pixel by 4, the signal levels of the upper, lower, right and left pixels by 2, the levels of the signals of the corner pixels by 1, and the sum of the thus-calculated levels by ¼. The thus-acquired signal is set as an addition signal S0 for each area of (3×3) pixels.

Subsequently, in the 5×5 pixel signals constituted of the RGB Bayer arrangement shown in FIG. 2B, the ratio calculating section 132 calculates average values of the same colors, i.e., the average values Rave (R average value), Gave (G average value) and Bave (B average value) of the R, G and B signals, and the total value Save of the average values. Further, the RGB generating section 133 generates new signals Rs, Gs and Bs, using the addition signal S0, the ratios "$R_{ave}/S_{ave}$", "$G_{ave}/S_{ave}$" and "$B_{ave}/S_{ave}$" and the following formulas:

$$R_s = S0*(R_{ave}/S_{ave})$$

$$G_s = S0*(G_{ave}/S_{ave})$$

$$B_s = S0*(B_{ave}/S_{ave})$$

As described above, the addition signal S0 reduces the random noise of the addition signal S0. Conventional false color due to edges can be suppressed by generating, from the addition signal S0, signals Rs, Gs and Bs as same-position pixel signals. Furthermore, since signals Rs, Gs and Bs are generated from the addition signal S0, they have the same random noise component, and hence contain no color noise. Namely, brightness noise does not occur. In the filter operation, since the ratio of the level of the G signal, which is greater in level than each of the R and B signals, to the level of each of the R and B signals is set to 2, an addition signal S0 improved in SNR by about 3 dB can be generated.

FIG. 3 shows another addition processing method in the adding section 131 of the color correlation RGB generating circuit 13. The 5×5 pixel arrangement is divided by the adding section 131 into four blocks AZ, BZ, CZ and DZ each constituted of four pixels of a 2×2 pixel arrangement in which the central pixel (target pixel) is located at a corner. In each of the four blocks, signals of the four pixels of the 2×2 pixel arrangement are added together and signals $S_a$, $S_b$, $S_c$ and $S_d$ are generated. Further, by averaging the four signals $S_a$, $S_b$, $S_c$ and $S_d$, i.e., by adding the signals $S_a$, $S_b$, $S_c$ and $S_d$ together and dividing the resultant by four, the addition signal S0 is generated. Subsequent processing is performed in the same manner as described previously, and new signals $R_s$, $G_s$ and $B_s$ are generated by using the addition signal S0 and the ratio coefficients "$R_{ave}/S_{ave}$", "$G_{ave}/S_{ave}$" and "$B_{ave}/S_{ave}$".

As described above, according to the first embodiment, by generating addition signals obtained by adding up pixel signals, random noise can be reduced and the signal-to-noise ratio can be increased. Further, by newly and simultaneously generating the R, G and B signals from the addition signal, a false color suppressing circuit for suppressing a false color resulting from demosaicking is made unnecessary, and an adverse influence of random noise resulting from color shifts of the R, G and B signals and an RGB single pixel can be eliminated. Hence, color noise of a single color can be suppressed. Further, even when the R, G and B signals are newly generated by a color matrix operation for improving color reproducibility, the signals $R_S$, $G_s$ and $B_s$ are generated from one addition signal, and hence random noise components included in the respective signals are in phase with each other. Accordingly, even when a signal is subjected to subtraction processing in the color matrix operation, noise is not increased.

Second Embodiment

Next, a solid-state image pickup device including a CMOS image sensor of a second embodiment of the present invention will be described below. The second embodiment is that to which a configuration for improving resolution of an edge of an image is added. The other configuration and advantage are similar to those of the first embodiment, the same parts as those of the first embodiment are denoted by the same reference symbols, and a description of them are omitted.

Figure 4:
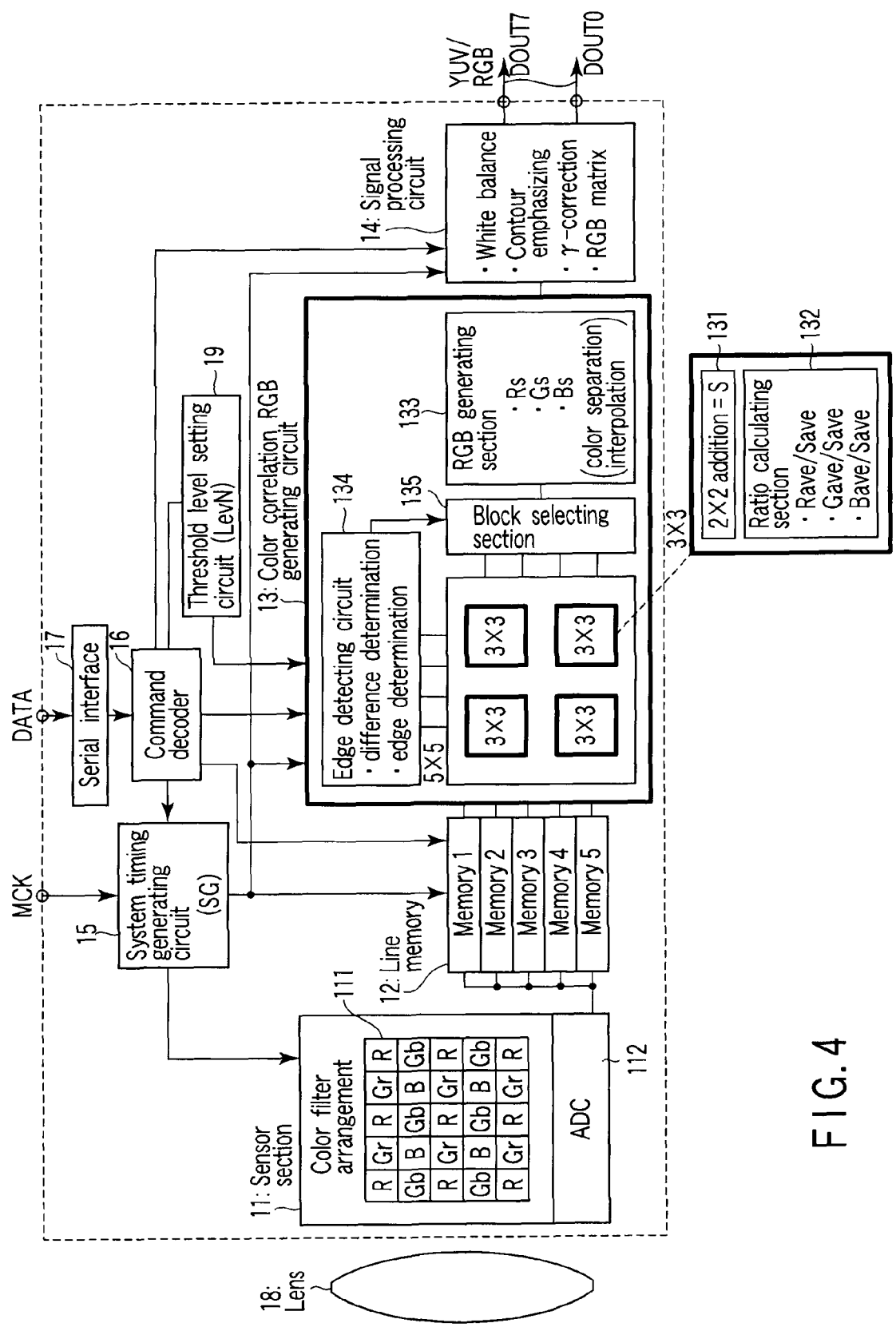
FIG. 4 is a block diagram showing a schematic configuration of a solid-state image pickup device of a second embodiment of the present invention.

FIG. 4 is a block diagram showing a schematic configuration of the solid-state image pickup device of the second embodiment. In the second embodiment, an edge detecting circuit 134 is provided in a color correlation RGB generating circuit 13 to increase resolution of an edge of an image. Further, in order to determine an edge signal, a threshold level setting circuit 19 is provided, thereby supplying a threshold level LevN assuming a noise level to the edge detecting circuit 134. The addition processing for generating addition signals, and ratio calculation processing for calculating ratio coefficients are performed by separating the 5×5 pixel arrangement into four blocks of a 3×3 pixel arrangement.

FIGS. 5A to 5F are views each showing a processing method in the edge detecting circuit 134 of the color correlation RGB generating circuit 13. Pixel signals of the 5×5 pixel arrangement are input to the edge detecting circuit 134 from a line memory 12 as shown in FIG. 5A. In the edge detecting circuit 134, when the central pixel of the 5×5 pixel arrangement is an R signal, the R signal is made to be R0, and the 5×5 pixel signals are separated into four blocks in each of which the R0 signal of the central pixel is located at a corner as shown in FIG. 5B. Here, the upper left block is made to be the block AZ, the upper right block is made to be the block BZ, the lower left block is made to be the block CZ, and the lower right block is made to be the block DZ.

Then, as shown in FIG. 5F, one-pixel difference determination processing is performed by a difference determining section of the edge detecting circuit 134. When the central pixel is R0, absolute values of difference signals R0-R1, R0-R2, R0-R3, R0-R4, R0-R5, R0-R6, R0-R7 and R0-R8 around R0 are calculated. Further, it is determined whether or not each of the absolute values is smaller than a threshold level LevN set in the threshold level setting circuit 19. Further, a logical sum (OR) of three determinations belonging to each block is taken, thereby finally determining whether or not an edge is present in the block. That is, of the three determinations in each block, when all the determinations are of the case where the absolute value is smaller than the threshold level LevN, it is determined that no edge is present in the block. When even only one determination is of the case where the absolute value is equal to the threshold level LevN or larger, it is determined that an edge is present in the block. The determination for determining whether or not an edge is present in the block is performed by an edge determining section in the edge detecting circuit 134.

Further, in the edge detecting circuit 134, when the central pixel of the 5×5 pixel arrangement is a B signal, the B signal of the central pixel is made to be B0, and the 5×5 pixel signals are separated into four blocks AZ, BZ, CZ and DZ, in each of which the B0 signal of the central pixel is located at a corner as shown in FIG. 5C. Subsequently, likewise, the one-pixel difference determination processing is performed by the difference determining section of the edge detecting circuit 134. When the central pixel is B0, absolute values of difference signals B0-B1, B0-B2, B0-B3, B0-B4, B0-B5, B0-B6, B0-B7 and B0-B8 are calculated. Further, it is determined whether or not each of the absolute values is smaller than the threshold level LevN. Further, a logical sum (OR) of three determinations belonging to each block is taken, thereby finally determining whether or not an edge is present in the block.

Further, in the edge detecting circuit 134, when the central pixel of the 5×5 pixel arrangement is a Gr signal, the 5×5 pixel signals are separated into four blocks AZ, BZ, CZ and DZ, in each of which the Gr signal of the central pixel is located at a corner as shown in FIG. 5D. Furthermore, in the edge detecting circuit 134, when the central pixel of the 5×5 pixel arrangement is a Gb signal, the 5×5 pixel signals are separated into four blocks AZ, BZ, CZ and DZ, in each of which the Gb signal of the central pixel is located at a corner as shown in FIG. 5E. The subsequent processing is the same as that described previously.

FIGS. 6A to 6E are views showing another processing method in the difference determination in the block. This difference determination is performed by a difference determining section of the edge detecting circuit 134. Here, a description will be given by using the upper left block AZ of the 3×3 pixel arrangement as an example as shown in FIG. 6A, and assuming that pixel signals of the 3×3 pixels are D1 to D9.

First, a two-pixel difference determining method will be described below. As shown in FIG. 6B, two pairs of pixels which are symmetrical with respect to the D5 pixel as a center are selected, and it is determined whether or not a signal level of a difference between addition signals obtained by adding up two pixels of each selected pixel pair is smaller than the threshold level LevN. Further, a logical sum (OR) of four determinations is taken as the final determination of the block.

Then, a three-pixel stripe difference determining method will be described below. As shown in FIG. 6C, two groups each constituted of three pixels linearly arranged in a stripe form which are symmetrical with respect to the D5 pixel as a center are selected, and it is determined whether or not a signal level of a difference between addition signals obtained by adding up three pixels of each selected group is smaller than the threshold level LevN. Further, a logical sum (OR) of two determinations is taken as the final determination of the block.

Besides, in a three-pixel L-shaped difference determining method, two groups each constituted of three pixels arranged in an L-shape which are symmetrical with respect to the D5 pixel as a center are selected as shown in FIG. 6D, and it is determined whether or not a signal level of a difference between addition signals obtained by adding up three pixels each selected group is smaller than the threshold level LevN. Further, a logical sum (OR) of two determinations is taken as the final determination of the block. Furthermore, in a four-pixel difference determining method, two groups of four pixels are selected as shown in FIG. 6E, and it is determined whether or not a signal level of a difference between addition signals obtained by adding up four pixels of each selected group is smaller than the threshold level LevN. Further, a logical sum (OR) of two determinations is taken as the final determination of the block. Determination of the block may be performed by using a plurality of determining methods of the above-mentioned determining methods. Alternatively, the determination of the block may be performed by using a determining method of the above-mentioned determining methods in order to reduce the number of circuits used for determination. By using an addition signal of two or more pixels as described above, random noise can be reduced, and highly accurate determination can be performed.

Figure 7:
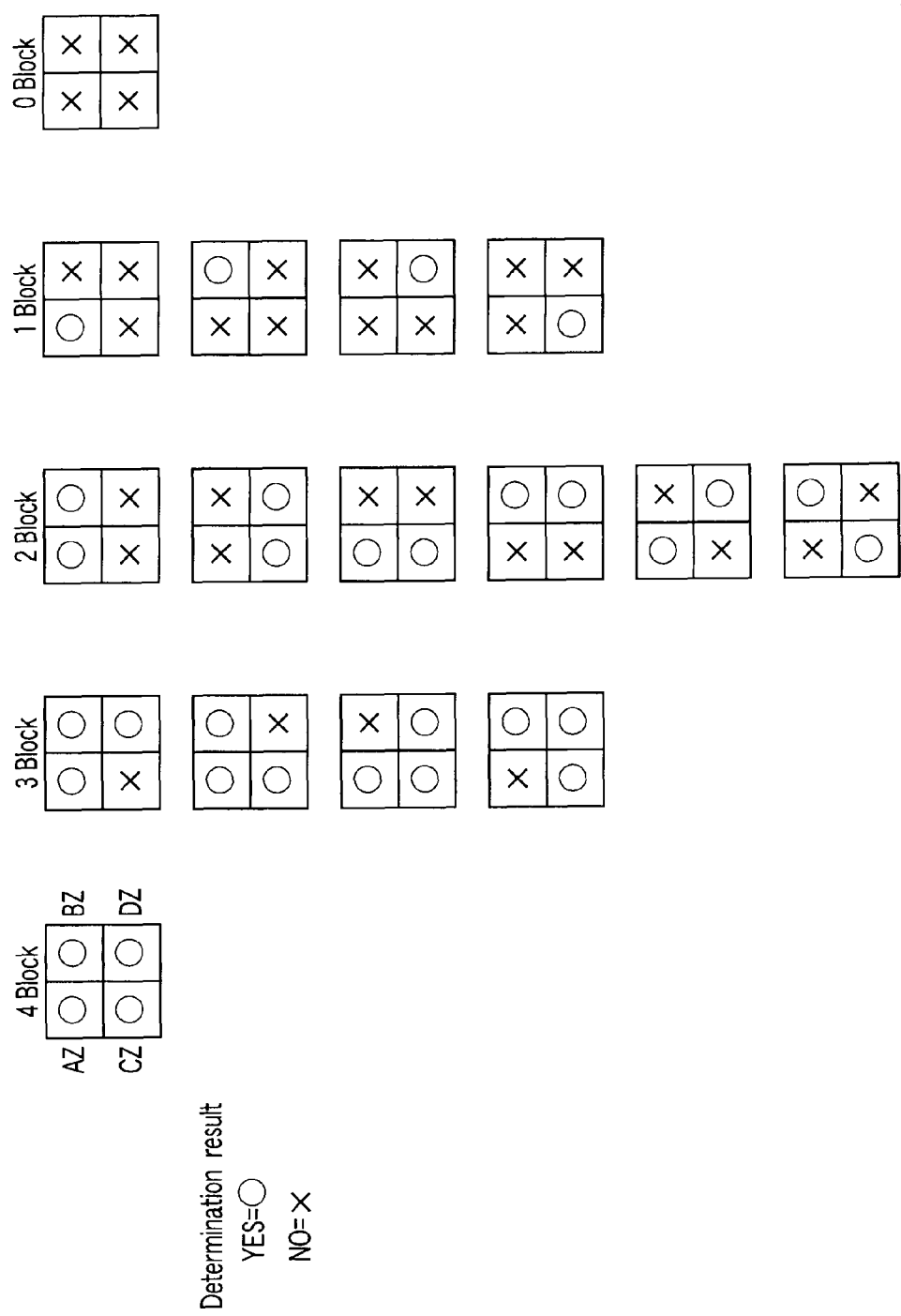
FIG. 7 is a view showing an example in which blocks AZ to DZ are determined in the edge detecting circuit of the second embodiment.

FIG. 7 shows an example, in which the blocks AZ to DZ are determined by the edge detecting circuit 134. When the difference signal level is smaller than the threshold level (YES), i.e., a case where no edge is present in the block is indicated by a mark O, and a case where the difference signal level is equal to or larger than the threshold level (NO), i.e., a case where an edge is present in the block is indicated by a mark X. As shown in FIG. 7, determination is performed for each of the four blocks AZ to DZ. By using such a determining method, it is possible to determine whether or not an edge is present even when an edge of an image incident on the sensor section 11 is present only at the corner, and when the edge is stripe-shaped, or is oblique.

Then, in accordance with a result of the edge determination for each of the four blocks, a block selected by a block selecting section 135 shown in FIG. 4 is subjected to the following processing by the color correlation RGB generating circuit 13.

Figure 8:
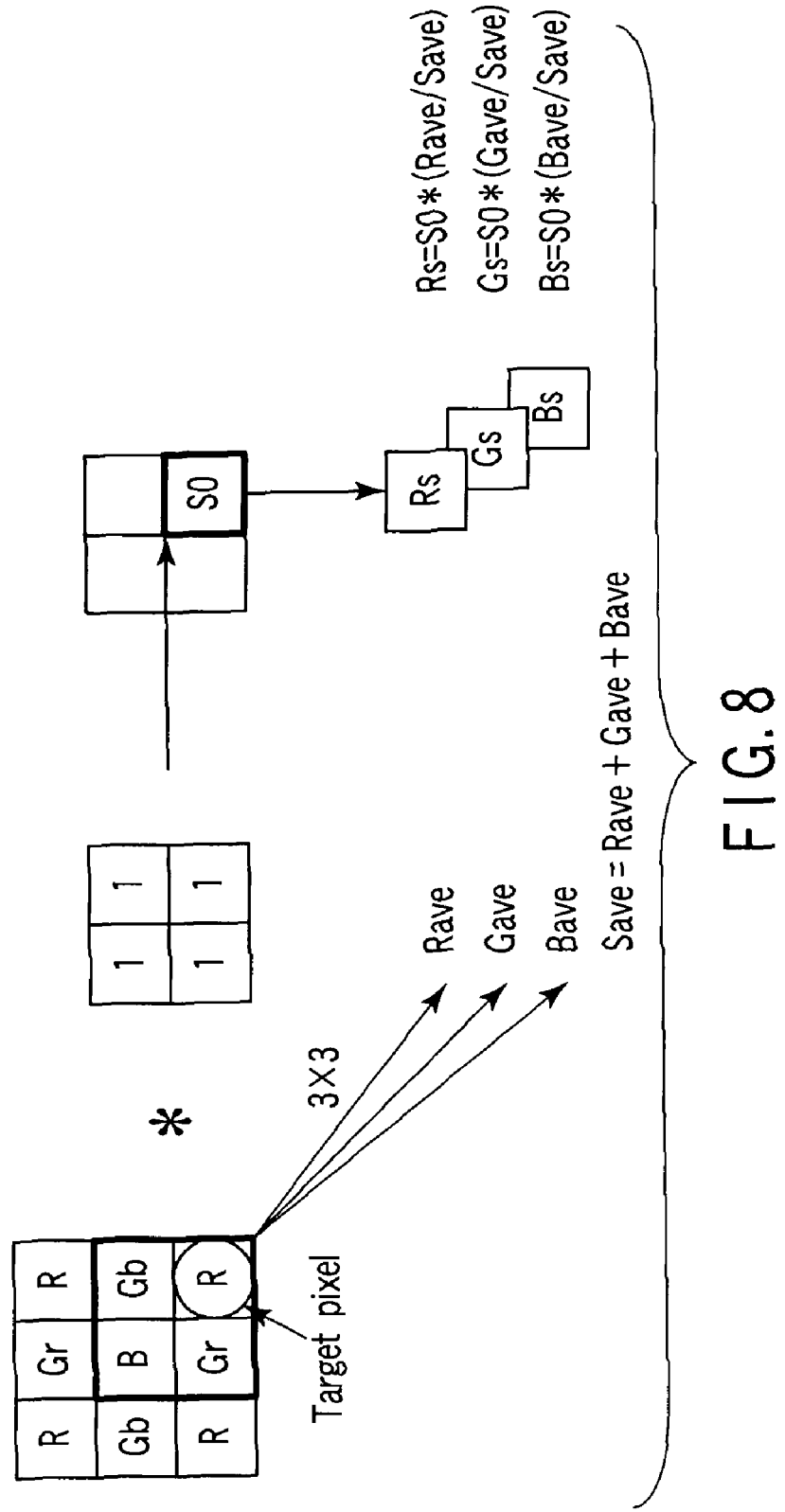
FIG. 8 is a view showing a processing method of generating an addition signal, calculating a ratio coefficient, and generating R, G and B signals for the block AZ in the upper left part in the second embodiment.

FIG. 8 is a view showing a processing method of generating an addition signal, calculating a ratio coefficient, and generating R, G and B signals by using the upper left block AZ as a representative. Addition processing of the 2×2 pixel signals is performed by using the central pixel (target pixel) located at the lower right position of the 3×3 pixel arrangement as a reference, and an addition signal S0 is generated. Further, in the 3×3 pixel signals constituted of the RGB Bayer arrangement shown in FIG. 8, average values of pixel signals of the same colors effective, i.e., the average values Rave (R average value), Gave (G average value) and Bave (B average value) of the R, G and B signals, and the total value Save of the average values are calculated. Incidentally, depending on the position of the pixel, there is a case where the number of pixels is one, and the number of the B pixel signals is one in this case. Further, new signals $R_s$, $G_s$ and $B_s$ are created by the following formulas.

$$R_s = S0 * (R_{ave}/S_{ave})$$

$$G_s = S0 * (G_{ave}/S_{ave})$$

$$B_s = S0 * (B_{ave}/S_{ave})$$

Likewise, as for the upper right, lower left, and lower right blocks BZ, CZ and DZ, calculation can also be performed. In the determination results shown in FIG. 7, when the number of blocks in which no edge is present is one, the above-mentioned processing is performed, and the signals $R_s$, $G_s$ and $B_s$ are output.

Figure 9:
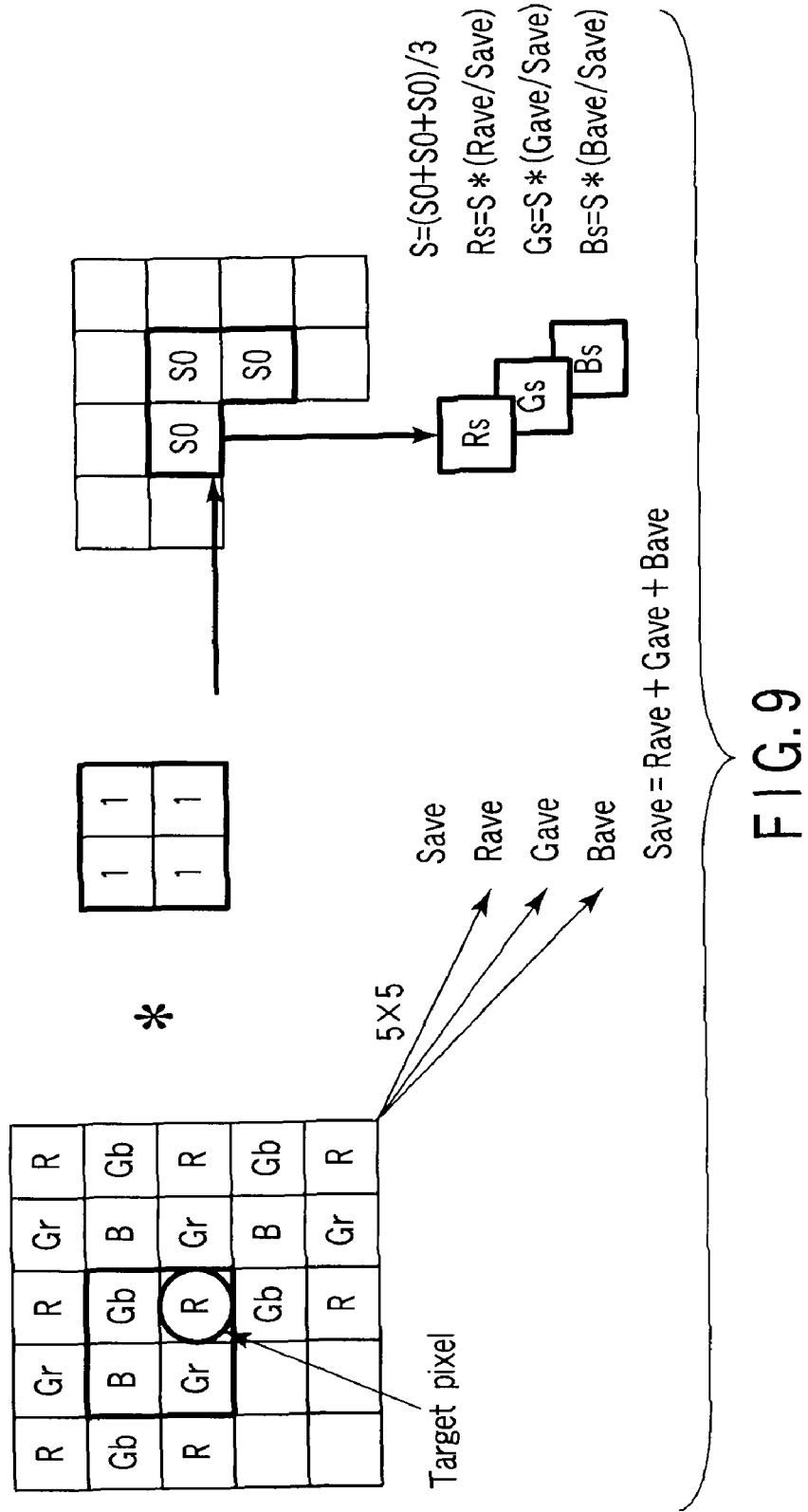
FIG. 9 is a view showing a processing example in a case where three blocks AZ, BZ and DZ in the second embodiment are selected.

FIG. 9 is a view showing a processing example of a case where three blocks AZ, BZ and DZ are selected in FIG. 5A. Addition processing of the 2×2 pixel signals is performed by using the central pixel of the 5×5 pixel arrangement as a reference, and three addition signals S0 are produced. Further, in the 5×5 pixel signals constituted of the RGB Bayer arrangement shown in FIG. 9, average values of pixel signals of the same colors of the L-shaped arrangement effective, i.e., the average values Rave (R average value), Gave (G average value) and Bave (B average value) of the R, G and B signals, and the total value Save of the average values are calculated. The number of the produced signals S0 is three, and hence an average value of the three signals is set as a signal S. Further, new signals $R_s$, $G_s$ and $B_s$ are produced by using the following formulas.

$$R_s = S * (R_{ave}/S_{ave})$$

$$G_s = S * (G_{ave}/S_{ave})$$

$$B_s = S * (B_{ave}/S_{ave})$$

Likewise, as for a case of a block of some other L-shape, calculation can also be performed.

Figure 10:
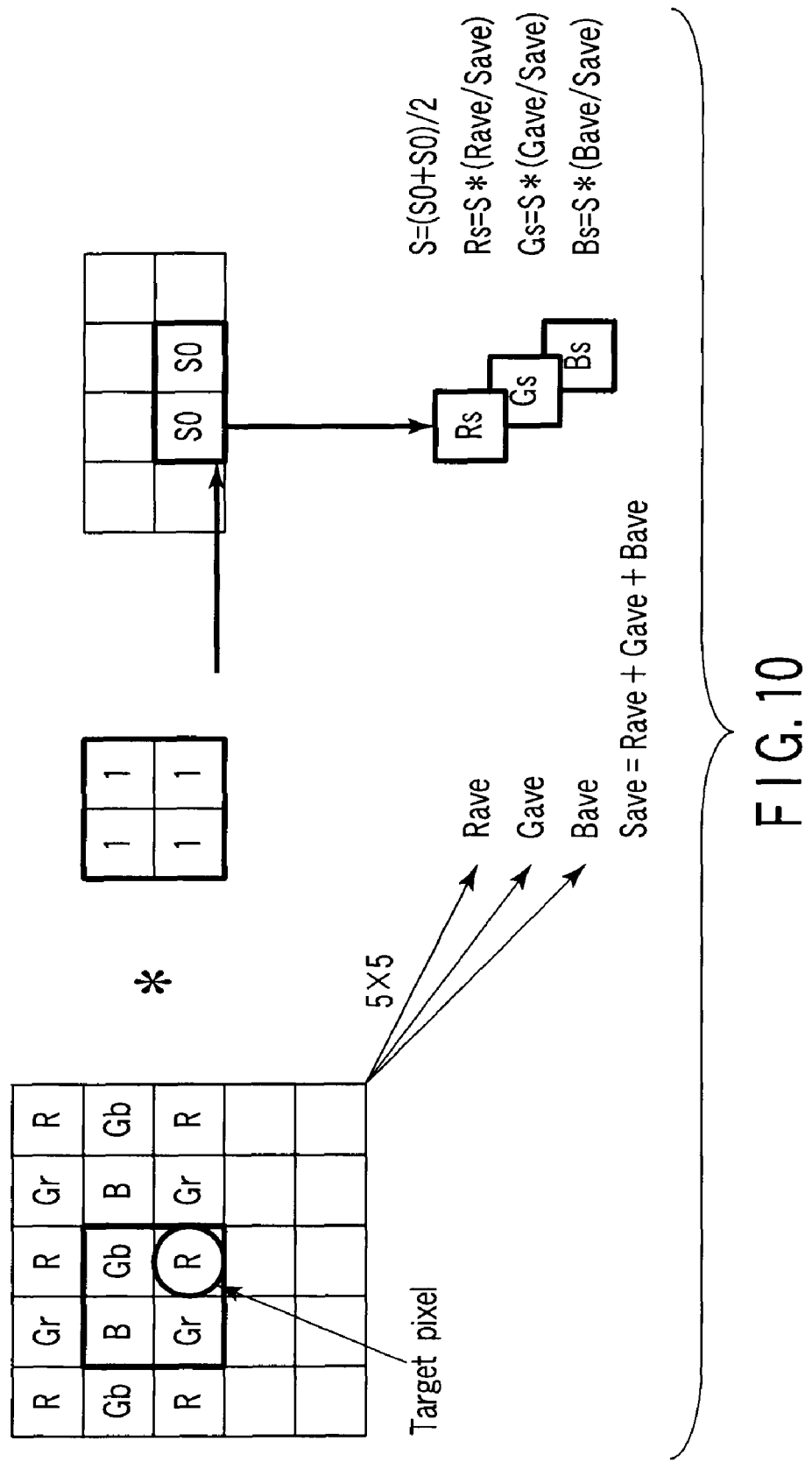
FIG. 10 is a view showing a processing example in a case where two blocks AZ and BZ in the second embodiment are selected.

FIG. 10 is a view showing a processing example of a case where two blocks AZ and BZ are selected in FIG. 5A. Addition processing of the 2×2 pixel signals is performed by using the central pixel of the 5×5 pixel arrangement as a reference, and two addition signals S0 are produced. Further, in the 5×5 pixel signals constituted of the RGB Bayer arrangement shown in FIG. 10, average values of pixel signals of the same colors effective, i.e., the average values Rave (R average value), Gave (G average value) and Bave (B average value) of the R, G and B signals, and the total value Save of the average values are calculated. The number of the produced signals S0 is two, and hence an average value of the two signals is set as a signal S. Further, new signals $R_s$, $G_s$ and $B_s$ are produced by using the following formulas.

$$R_s = S * (R_{ave}/S_{ave})$$

$$G_s = S * (G_{ave}/S_{ave})$$

$$B_s = S * (B_{ave}/S_{ave})$$

Likewise, as for a case of the other two blocks, calculation can also be performed.

Figure 11:
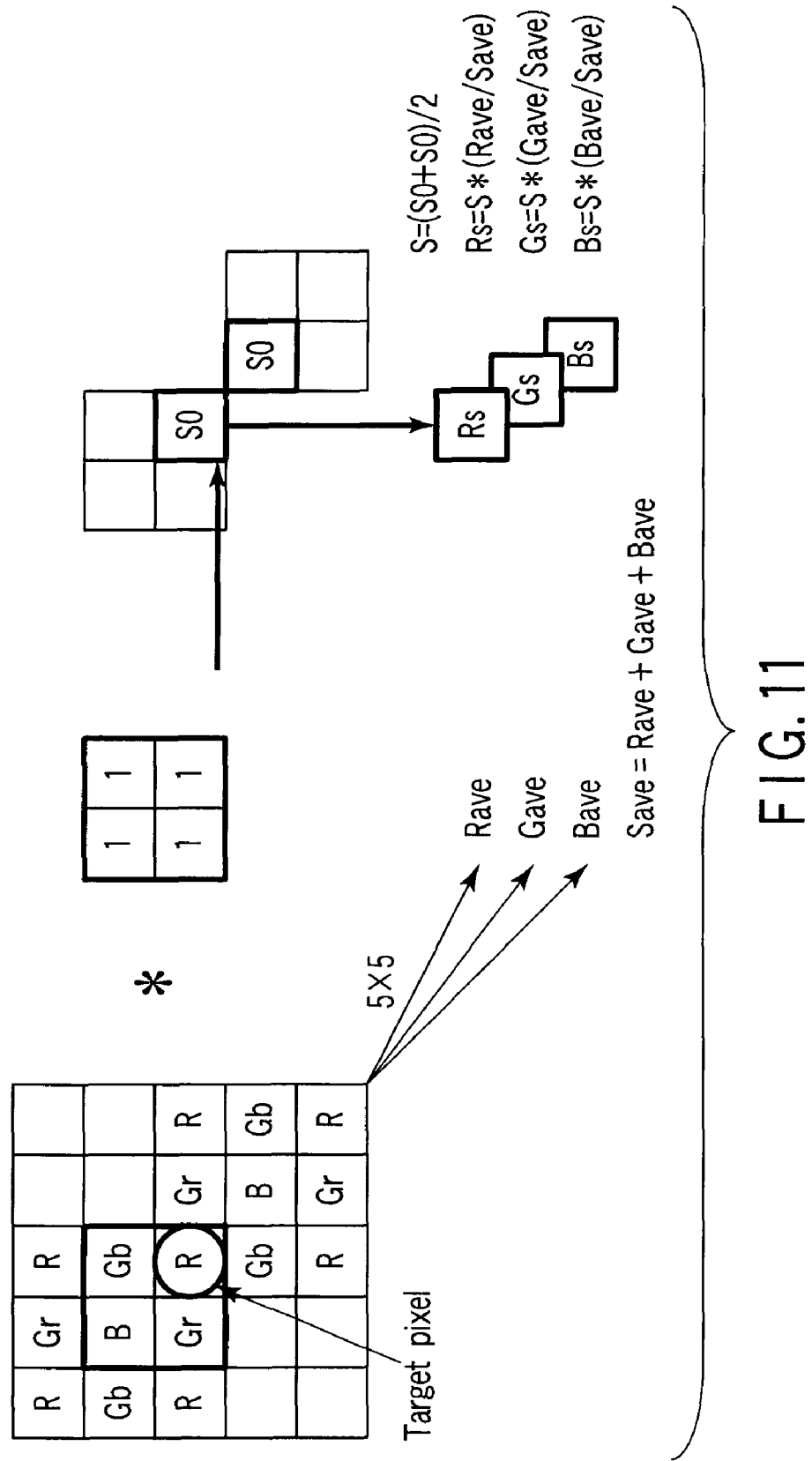
FIG. 11 is a view showing a processing example in a case where two blocks AZ and DZ which are obliquely arranged in the second embodiment are selected.

FIG. 11 is a view showing a processing example of a case where two blocks AZ and DZ obliquely arranged in FIG. 5A are selected. Addition processing of the 2×2 pixel signals is performed by using the central pixel of the 5×5 pixel arrangement as a reference, and two addition signals S0 are produced. Further, in the 5×5 pixel signals constituted of the RGB Bayer arrangement shown in FIG. 11, average values of pixel signals of the same colors effective, i.e., the average values Rave (R average value), Gave (G average value) and Bave (B average value) of the R, G and B signals, and the total value Save of the average values are calculated. The number of the produced signals S0 is two, and hence an average value of the two signals is set as a signal S. Further, new signals $R_s$, $G_s$ and $B_s$ are produced by using the following formulas.

$$R_s = S * (R_{ave}/S_{ave})$$

$$G_s = S * (G_{ave}/S_{ave})$$

$$B_s = S * (B_{ave}/S_{ave})$$

Likewise, as for a case of the other two blocks which are obliquely arranged in the opposite way, calculation can also be performed.

Figure 12:
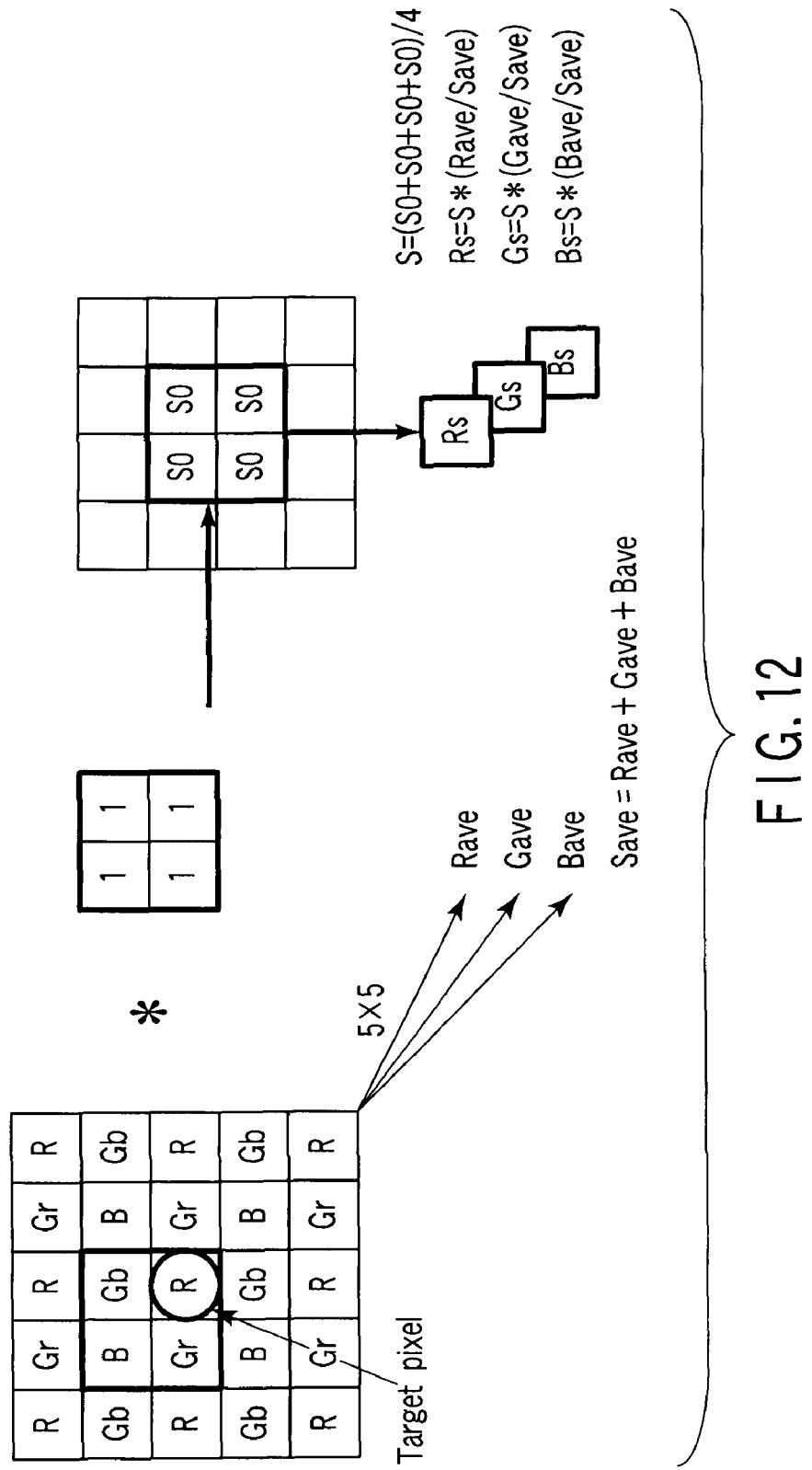
FIG. 12 is a view showing a processing example in a case where four blocks AZ, BZ, CZ and DZ in the second embodiment are selected.

FIG. 12 is a view showing a processing example of a case where four blocks AZ, BZ, CZ and DZ are selected in FIG. 5A. Addition processing of the 2×2 pixel signals is performed by using the central pixel of the 5×5 pixel arrangement as a reference, and four addition signals S0 are produced. Further, in the 5×5 pixel signals constituted of the RGB Bayer arrangement shown in FIG. 12, average values of pixel signals of the same colors, i.e., the average values Rave (R average value), Gave (G average value) and Bave (B average value) of the R, G and B signals, and the total value Save of the average values are calculated. The number of the produced signals S0 is four, and hence an average value of the four signals is set as a signal S. Further, new signals $R_s$, $G_s$ and $B_s$ are produced by using the following formulas.

$$R_s = S*(R_{ave}/S_{ave})$$

$$G_s = S*(G_{ave}/S_{ave})$$

$$B_s = S*(B_{ave}/S_{ave})$$

The processing method shown in FIG. 12 can also be applied to a case where a determination result in the edge detecting circuit 134 is 0 block, i.e., a case where the number of blocks in which no edge is present is zero. When the determination result is 0 block, the respective signal levels of the 5×5 pixels vary at random. For that reason, the addition signals S obtained by adding up the respective 2×2 pixel signals also vary. However, by calculating average values of pixel signals of the same colors on the basis of the 5×5 pixels, and producing the R, G and B signals on the basis of the calculation of the ratio of each of them to the addition signal S, color noise does not occur. The brightness signal changes in accordance with the addition signal S of the 2×2 pixel signals, and hence resolution information can be obtained.

OTHER EXAMPLES

In the above-mentioned embodiments, although the description has been given on the basis of the 5×5 pixel arrangement, if the pixel arrangement is changed to a 7×7 pixel arrangement, and production of the addition signal in the block, and calculation of ratio coefficients are performed by using 4×4 pixels, a further higher signal-to-noise ratio and a higher image quality can be realized.

Further, when the number of blocks to be selected is two to four, and when the number of blocks to be selected is zero, the processing method is changed according to the number of blocks to be selected. However, in order to reduce the number of circuits, the respective signals $R_s$, $G_s$ and $B_s$ that can be obtained from the processing for one block shown in FIG. 8 may be calculated for each block, and an average value of the respective signals $R_s$, $G_s$ and $B_s$ may be obtained according to the number of blocks to be selected. Alternatively, new signals $R_s$, $G_s$ and $B_s$ may be produced from the respective signals S0 of four blocks, and an average value of the values $R_{ave}$, $G_{ave}$ and $B_{ave}$. Further, as for the selection, by the block selecting section 135, of a block in which no edge is present, the respective difference signals of four blocks are compared with each other, only one block a difference signal of which is the smallest may be selected, and the signals $R_s$, $G_s$ and $B_s$ may be thereby produced.

Further, as a factor in the deterioration of the signal-to-noise ratio of a color camera, there is the RGB matrix circuit. This circuit performs an RGB matrix operation to improve the RGB color reproducibility. An example of the operational expression used at this time is shown as the formula (1).

$$\begin{pmatrix} R \\ G \\ B \end{pmatrix} = \begin{pmatrix} 1.83 & -0.80 & -0.03 \\ -0.68 & 2.48 & -0.80 \\ -0.33 & -0.80 & 2.13 \end{pmatrix} * \begin{pmatrix} Rs \\ Gs \\ Bs \end{pmatrix} \qquad (1)$$

In this processing, the other two colors are subtracted from the own color. That is, by reducing an amount of the other two colors mixed into the own color, the purity of the own color is increased and the color reproducibility is improved. Factors in the color mixture are spectral characteristics of the color filter itself, optical crosstalk occurring at stages up to the photodiode of the image sensor, diffusion of a signal in the silicon substrate, and the like. As a result of the subtraction processing, the noise amount has been increased because the noise in the R, G and B signals has been randomly caused in the prior art technique. On the other hand, according to this system of the present invention, each of the random noise components of the $R_s$, $G_s$ and $B_s$ signals is of the same component, and hence a random noise reduction effect can be obtained by the subtraction processing. For example, when the R signal is produced, if the $R_s$ signal is increased by the random noise, the signals $G_s$ and $B_s$ are also increased. In the matrix operation, the R signal subtracts $G_s$ and $B_s$ components from the $R_s$ signal, and hence a larger amount of the signal corresponding to the increased amount of the noise is subtracted. Thus, the R signal subtracts larger amounts of the signals from the $R_s$ signal. Conversely, if the $R_s$ signal is decreased by the random noise, the signals $G_s$ and $B_s$ are also decreased. In the matrix operation, the R signal subtracts $G_s$ and $B_s$ components from the $R_s$ signal, and hence a smaller amount of the signal corresponding to the decreased amount of the noise is subtracted. Accordingly, the reduction in the signal amount is small in the R signal. As a result of this, the R signal has an effect of reducing the random noise. Likewise, the random noise of each of the G and B signals is also reduced.

Further, as a problem of the color camera to be solved, there is a problem that a false color is attached to an edge of an image due to the chromatic aberration of the optical lens. This chromatic aberration occurs due to a difference in the refractive index of the RGB light caused by the optical lens. By performing a determination based on the difference signal of only the G signal as the block determination in the embodiments of the present invention, it is possible to make the R and B signals at an edge negligible, and suppress an artifact at an edge by producing $R_s$, $G_s$ and $B_s$ signals by the calculation of the ratio coefficients of the peripheral pixels.

Furthermore, as a problem of the color camera, moire which causes coloring at a low frequency when a fine pattern of a high frequency is imaged occurs. The cause of this phenomenon is that the pixel pitch of the RGB pixels and the signal pitch of the subject are out of phase, and hence the amount of the signal incident on the pixel varies, and a beat-like false color signal is generated. However, in the formation of addition signal in the embodiments of the present invention, high-frequency components are reduced, and the $R_s$, $G_s$ and $B_s$ signals are produced from the addition signal, and hence a signal that enhances only the R and B signals (false color) is not generated, and the $R_s$, $G_s$ and $B_s$ signals vary simultaneously, whereby only the brightness signal is varied. Thus, the false coloring caused by moire that has been the problem of the prior art is suppressed.

Further, in the embodiments of the present invention, even when an image sensor having a different color filter arrangement is used, after producing the R, G and B signals, new $R_s$, $G_s$ and $B_s$ signals are produced on the basis of formation of the similar addition signal and calculation of the ratio coefficients of the R, G and B signals, whereby the same effect can be obtained. Further, the embodiments of the present invention are not limited to the CMOS image sensor, and other CCD image sensors and stacked image sensors formed of stacked photoelectric transfer films can also be applied. Further, a dedicated image signal processor (ISP) can be used for processing.

Figure 13:
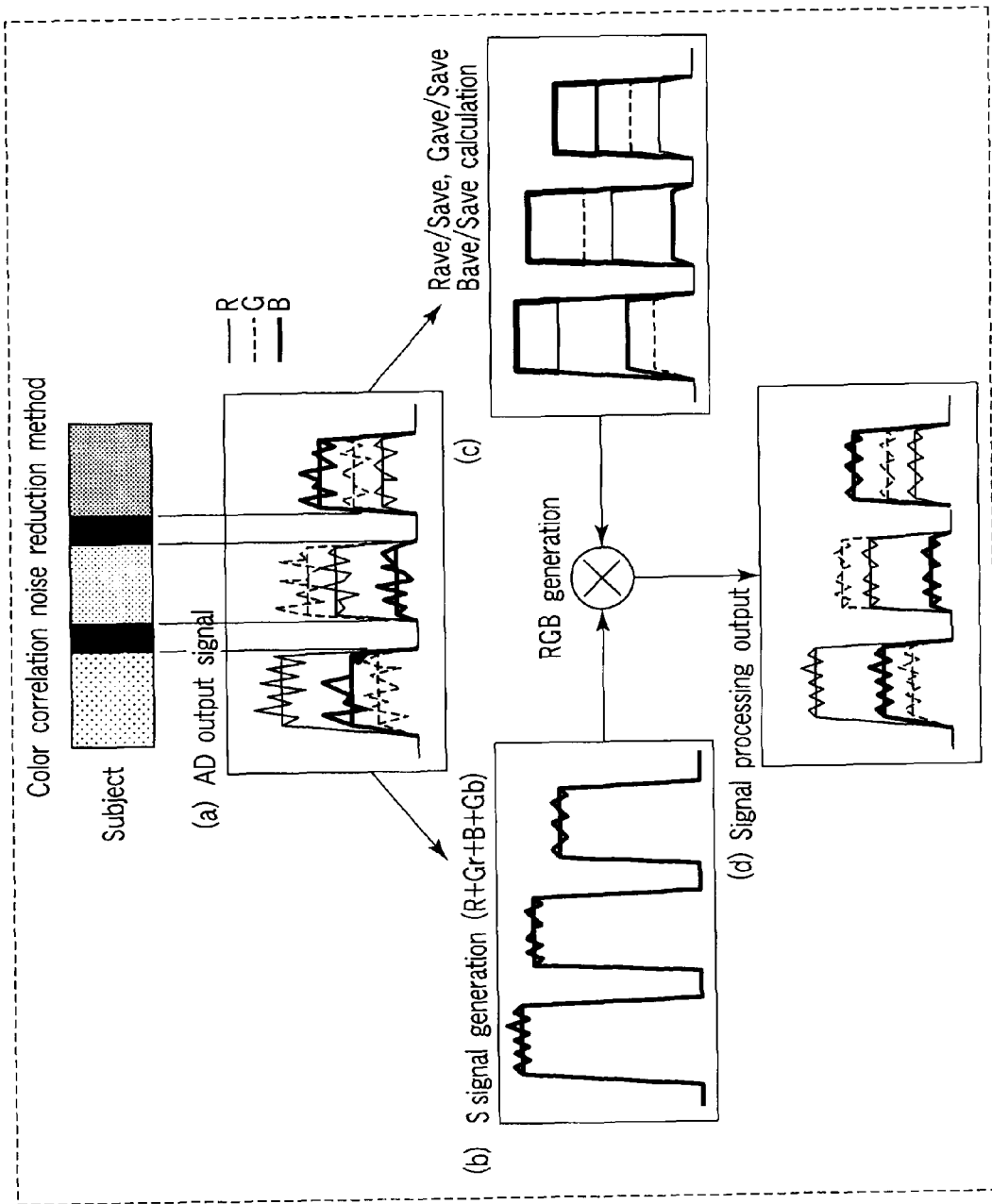
FIG. 13 is a view showing an outline of a method of reducing color correlation noise used in the embodiment of the present invention.

An outline of the color correlation noise reduction method used in the embodiments of the present invention will be described below. FIG. 13 is a view showing the color correlation noise reduction method. Here, output signals obtained from three types of subjects are taken as examples. Showing the signals obtained from the three types of subjects in terms of R, G and B signals provides patterns shown in (a) of FIG. 13. Then, as shown in (b) of FIG. 13, R, Gr, B and Gb signals are added to each subject, thereby producing an addition signal S. Further, as shown in (c) of FIG. 13, the ratio coefficient of each of the average values Rave, Gave and Bave of same-color pixels to the total value Save of the average values is calculated in each subject. Further, the addition signal S obtained as shown in (b) of FIG. 13 is multiplied by each of the ratio coefficients obtained as shown in (c) of FIG. 13, thereby producing new R, G and B signals. By virtue of such processing, random noise can be reduced, and the signal-to-noise ratio can be increased. Moreover, a false color signal and color noise can also be reduced.

Figure 14:
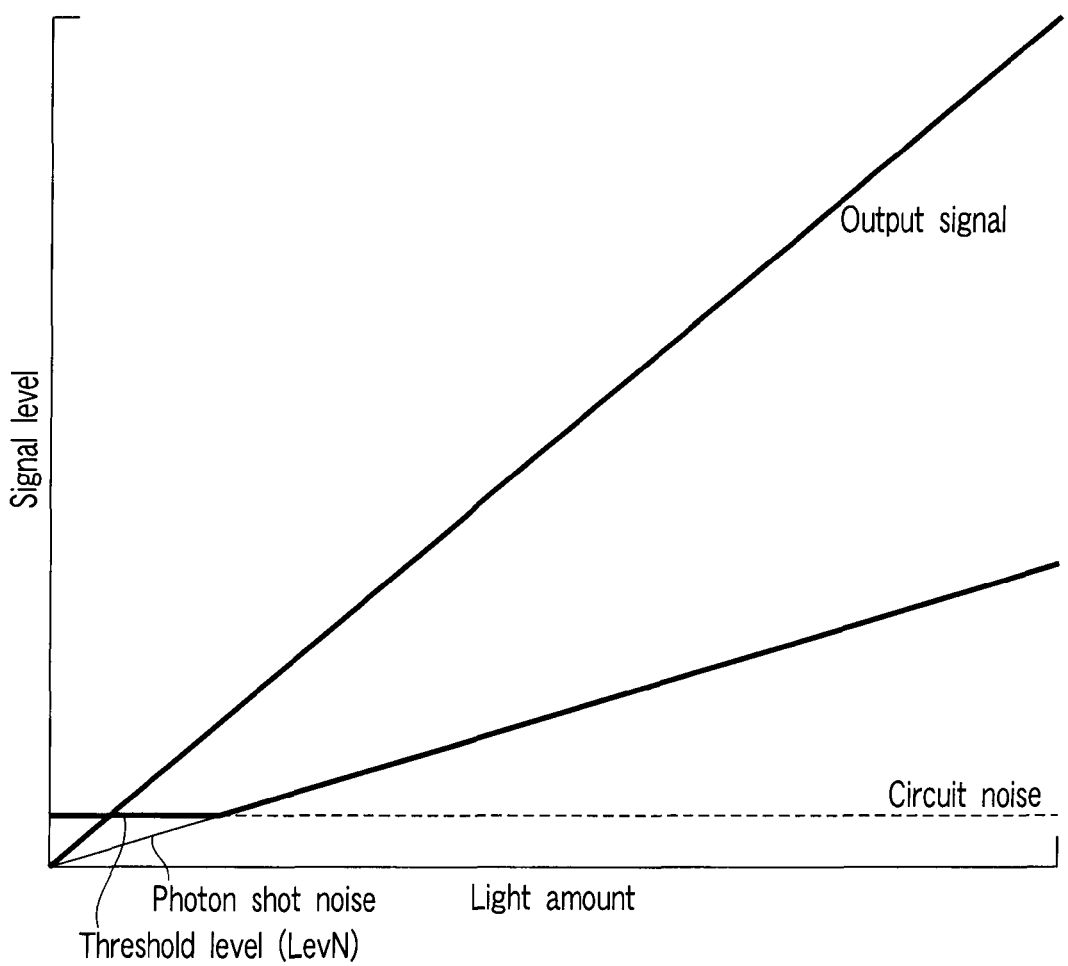
FIG. 14 is a view showing a photoelectric conversion characteristic and a threshold level in a sensor section of the embodiment of the present invention.

Further, the threshold level LevN setting method used in the threshold level setting circuit 19 in the embodiment described previously will be described below. FIG. 14 is a view showing the photoelectric conversion characteristic of the sensor section 11 and the threshold level. As the amount of light incident on the sensor section 11 becomes larger, the output signal from the sensor section 11 becomes larger. With an increase in the output signal, photon shot noise also increases. The photon shot noise occurs in proportion to a square root of the photon amount. Further, when an amount of light incident on the sensor section 11 is small, circuit noise is more dominant than the photon shot noise. Thus, the value of the threshold level LevN assuming the noise level is set to a value assuming the circuit noise when the photon amount is small, and when the photon amount is large, the value of the threshold level is controlled in such a manner that the value becomes larger in accordance with the photon shot noise. By virtue of such control, the random noise can be effectively suppressed. Further, the brightness signal is produced on the basis of the following ratio.

$$Y=0.59G+0.3R+0.11B$$

Thus, if the threshold level LevN is set large when noise suppression processing of R and B having a small contribution effect on the brightness signal is performed, the random noise suppression effect for R and B can be enhanced.

Further, it is more effective to set the threshold level LevN according to each of the RGB signal amounts and in accordance with the gain ratio of the white balance. Further, when shading correction is performed for some reason of the optical characteristic of a lens, the farther the area on the screen is from the center of the screen, i.e., the closer the area on the screen is to the uppermost, lowermost, rightmost, leftmost positions, and the corners, the higher the digital gain for amplifying the signal is made. For this reason, the random noise is increased at the upper, lower, right and left parts, and at the corners on the screen. Thus, if the threshold level LevN is made large at the upper, lower, right and left parts, and at the corners of the screen in accordance with the gain, the noise suppression effect can be enhanced, and the image quality can be increased. As described above, by appropriately changing the threshold level LevN in accordance with the signal amount, screen position, color information, gain information, and the like, a higher image quality can be realized.

As has been described above, according to the embodiments of the present invention, it is possible to provide a solid-state image pickup device capable of suppressing the color artifact of the R, G and B signals, and reducing noise. More specifically, in the embodiments of the present invention, the addition signal is produced by adding the R, G and B signals. Further, a color ratio is calculated from the color information on the peripheral pixels of the addition pixel, and R, G and B signals are newly produced from the addition signal, whereby demosaicking processing can be executed simultaneously. The addition signal is produced by adding up the pixel signals as described above, whereby the signal-to-noise ratio can be increased. Further, by simultaneously and newly producing the R, G and B signals from the addition signal, it is possible to provide an image pickup device of a high image quality in which color shift and color noise of the R, G and B signals are suppressed.

According to the embodiments of the present invention, it is possible to provide a solid-state image pickup device capable of suppressing the color artifact of the R, G and B signals, and reducing noise.

Furthermore, the embodiments described previously can not only be implemented singly, but also can be implemented by appropriately combining with each other. Moreover, inventions of various stages are included in the embodiments described previously, and by appropriately combining a plurality of constituent elements disclosed in the embodiments with each other, inventions of various stages can be extracted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state image pickup device comprising:
   a pixel section in which an R pixel, a G pixel and a B pixel having photoelectric conversion elements provided with respective color filters of red (R), green (G) and blue (B) are arranged two-dimensionally in a matrix form, the pixel section outputting an R signal, a G signal and a B signal which are obtained by photoelectrically converting light incident on the R, G and B pixels;
   an adding section which determines a prescribed area with respect to a certain pixel set as a central pixel, and which adds the R, G and B signals from the central pixel and peripheral pixels arranged on the periphery of the central pixel in the prescribed area to produce an addition signal;
   a ratio calculating section which calculates an average value of each of the R, G and B signals, and a ratio coefficient of the average value of each of the R, G and B signals to a total value of the average values; and
   an RGB generating section which multiplies the addition signal by the ratio coefficients to generate a new R signal, a new G signal and a new B signal, respectively, which correspond to the central pixel and replace the R signal, G signal and the B signal which are obtained by photoelectrically converting light incident on the R, G and B pixels.

2. The solid-state image pickup device according to claim 1, wherein
the adding section adds up signals from four pixels of a 2×2 pixel arrangement, from nine pixels of a 3×3 pixel arrangement, or from twenty-five pixels of a 5×5 pixel arrangement, the four pixels, the nine pixels or the twenty-five pixels being arranged in a matrix form.

3. The solid-state image pickup device according to claim 1, wherein the adding section multiplies coefficients by a signal of the central pixel from nine pixels of a 3×3 pixel arrangement or from twenty-five pixels of a 5×5 pixel arrangement, and adds the resultant signals.

4. The solid-state image pickup device according to claim 1, wherein the adding section multiplies the R, G and B signals by respective coefficients to make a ratio between R: G: B equal to 1:1:1, and adds the resultant signals.

5. The solid-state image pickup device according to claim 1, further comprising an edge detecting section which detects an edge signal of an image incident on the pixel section.

6. The solid-state image pickup device according to claim 5, wherein
the edge detecting section divides the prescribed area into four blocks each of which is constituted of a plurality pixels including the central pixel, and is provided with a difference determining section which compares a difference between a signal including the central pixel and a signal of the other pixels of the same color and a predetermined value with each other in order to determine which of the difference and the predetermined value is larger/smaller than the other.

7. The solid-state image pickup device according to claim 6, further comprising a block selecting section which selects a block from the four blocks in accordance with a determination result of the difference determining section.

8. The solid-state image pickup device according to claim 1, wherein the adding section performs a filter operation with respect to a 3×3 pixel arrangement centering on a central pixel of a 5×5 pixel arrangement arranged in a matrix form in order to obtain the addition signal, and
calculates the average value of each of the R signal, the G signal and the B signal from said each 5×5 pixel arrangement arranged on the periphery of the central pixel.

9. The solid-state image pickup device according to claim 8, wherein
in the filter operation, a signal of a central pixel of the 3×3 pixel arrangement is multiplied by four, signals of pixels arranged in the row direction and in the column direction with respect to the central pixel are multiplied by two, signals of pixels arranged at corners are multiplied by one, and a signal obtained by totaling these signals is divided by four.

10. The solid-state image pickup device according to claim 8, wherein in the filter operation, a signal of the central pixel of the 3×3 pixel arrangement is multiplied by four, signals of the other 8 pixels of the 3×3 pixel arrangement are multiplied by one, and a signal obtained by summing these signal is divided by three.

11. The solid-state image pickup device according to claim 1, wherein the adding section divides 5×5 pixel arrangements in a matrix into four blocks each including a 3×3 pixel arrangement formed using a central pixel of each 5×5 pixel arrangement as a corner, selects at least one of the four blocks, and adds signals of each 2×2 pixel arrangement which includes a central pixel of the 3×3 pixel arrangement and is included in the selected at least one block.

12. The solid-state image pickup device according to claim 11, wherein the adding section adds the signals after multiplying the signals of said each 2×2 pixel arrangement by coefficients to set a ratio between levels of the R signal, the G signal and the B signal to 1:1:1.

13. The solid-state image pickup device according to claim 1, further comprising a signal processing circuit which receives the R signal, G signal and B signal generated by the RGB generating section in order to subject the received R, G and B signals to processing of at least any one of a white balance circuit, contour emphasizing circuit, gamma correction circuit, and RGB matrix circuit.

14. The solid-state image pickup device according to claim 1, wherein the photoelectric converting means includes a photodiode.

* * * * *